April 9, 1929.  M. KLEIN  1,708,764
ELECTRICAL CONDENSER
Filed May 25, 1926   2 Sheets-Sheet 1
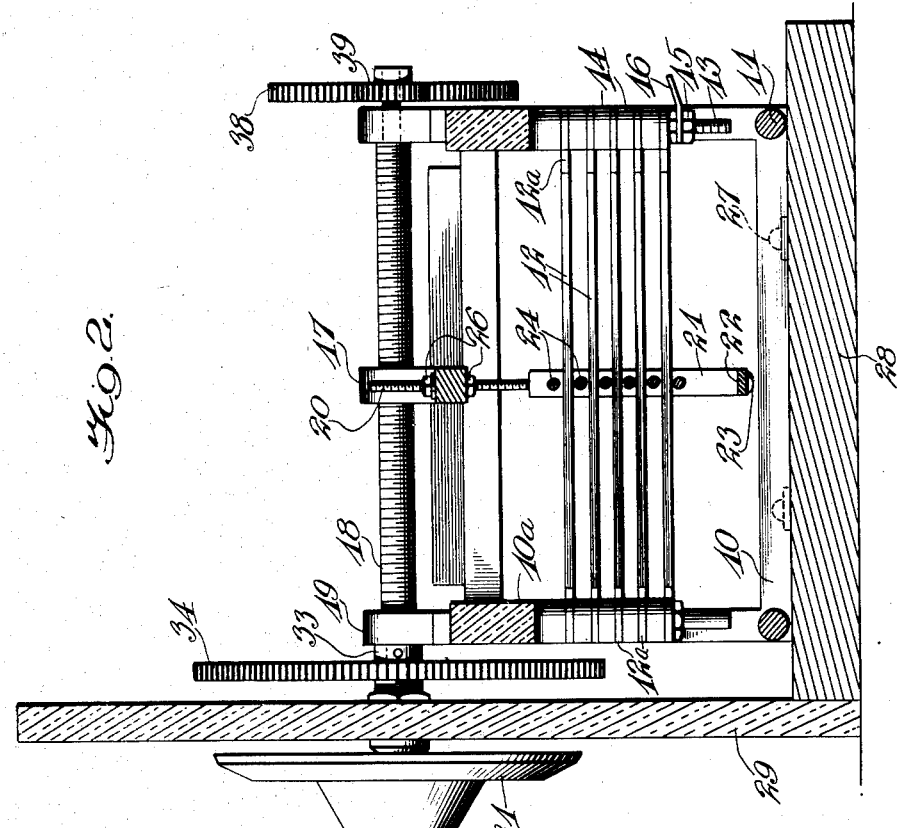
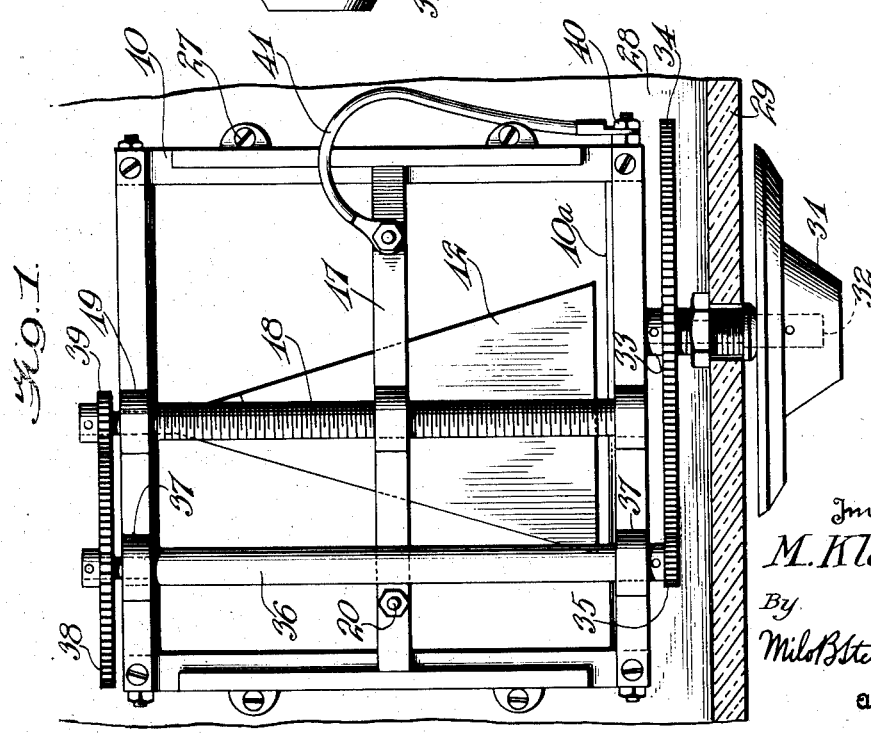
Inventor:-
M. Klein
By
Milo B Stevens Co
Attorneys.

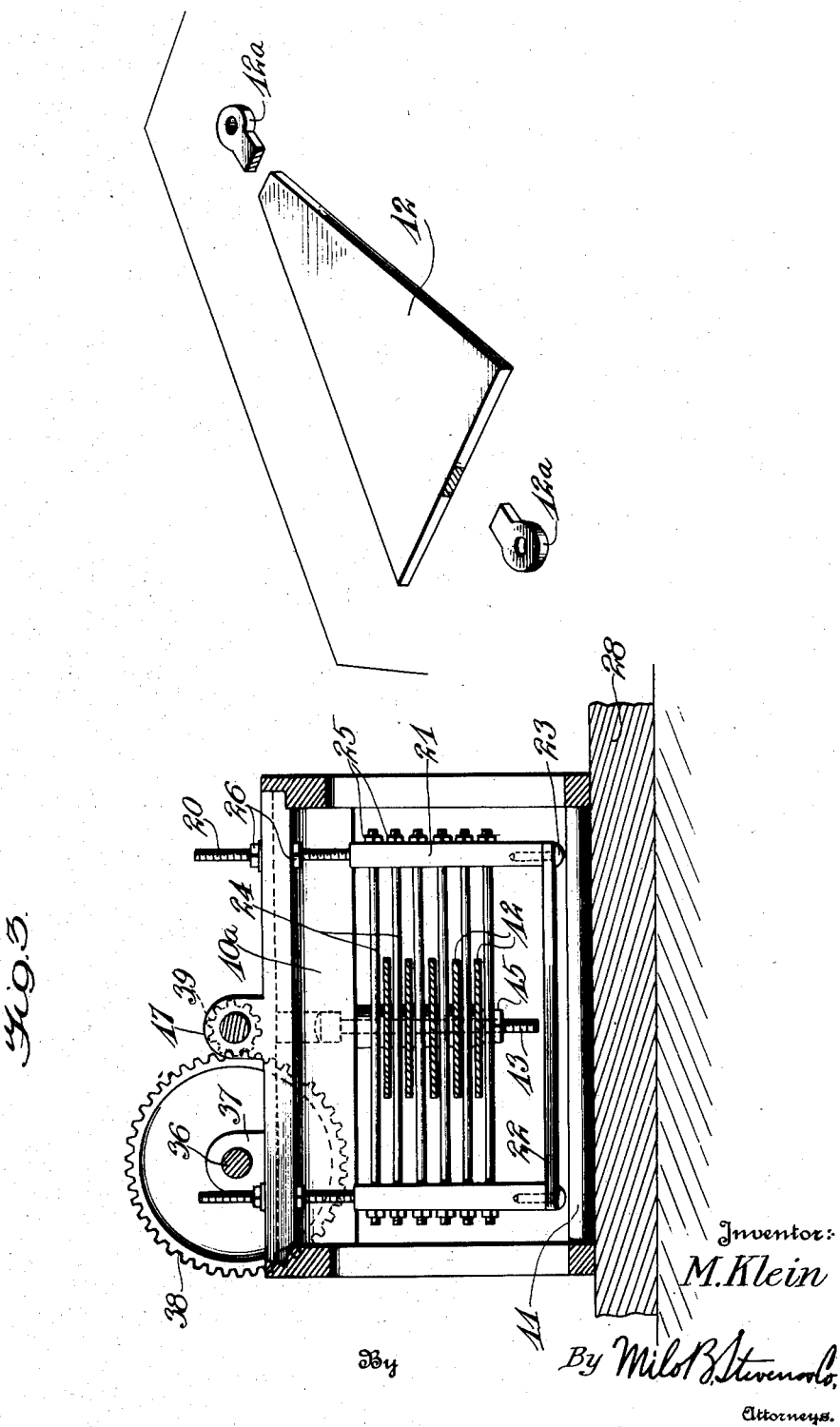

Patented Apr. 9, 1929.

1,708,764

UNITED STATES PATENT OFFICE.

MAX KLEIN, OF CHICAGO, ILLINOIS.

ELECTRICAL CONDENSER.

Application filed May 25, 1926. Serial No. 111,605.

This invention relates to electrical condensers of the variable type, and more particularly to that class of condensers which is generally employed in radio receiving apparatus, it being the object of the present invention to provide a condenser in which the spacing of the conducting elements is uniform during the operation of the appliance.

A further object of the invention is to provide an appliance of this kind which embodies a series of stator plates of novel form and suitable for securing frequencies of straight line character.

A still further object of the invention is to combine a novel movable element with the stator whereby selectivity and uniformity of variation may result in the operation of the condenser.

Another object of the invention is to construct the same with a novel positive operating motion, which imparts a vernier action to the moving element and therefore results in a fine adjustment.

A final but nevertheless important object of the invention is to construct the same in simple and rugged fashion for handling by amateurs without risk of damage or alteration of adjustments.

With the above objects in view and any others that may suggest themselves from the specification and claims to follow, a better understanding of the invention may be had by reference to the accompanying drawings, in which—

Figure 1 is a plan view of the novel condenser, as applied to a panel of a typical receiving set, such panel being shown in section;

Fig. 2 is a side elevation of the appliance, partly in section;

Fig. 3 is a section on the line 3—3 of Fig. 2; and

Fig. 4 is a perspective view, in detached form, of one of the conducting elements.

Referring specifically to the drawings, 10 denotes the side pieces of a frame within which the parts making up the condenser are contained, such frame being braced at the top by cross-pieces 10$^a$ of insulation, and at the bottom by metal rods 11.

The stator of the condenser comprises a series of vertical spaced plates 12 of sheet metal, these plates having eye-extensions 12$^a$ at the ends to permit their being grouped on a vertical screw 13 depending from the cross piece 10$^a$, in alternation with washers 14. The series of plates is supported upon the screws 13 by nuts 15 at the bottom and constitute the stator element. The capacity of this element may be increased by removing the nuts 15 and adding plates and washers to suit, the screws 13 being of sufficient length to permit such addition. Conversely, should the capacity of the stator be too great for a given condition, some plates may be removed. A soldering lug 16 is included in one of the fastenings, for a lead representing the stator terminal of the condenser.

The movable element or actuator in the present instance is not rotary as is the present practice, but horizontally movable along the stator element. The movable element consists of a cross-head 17 mounted like a nut upon a screw 18 disposed transversely of the condenser above the same, and having bearings 19 erected upon the cross-pieces 10$^a$. The cross-head 17 carries near its ends vertical screws 20 by which are suspended two laterally spaced posts 21, these posts being kept properly spaced at the bottom by a strap 22 secured to the posts by screws 23. Across the space between the posts are arranged a series of vertically spaced rods 24 these being disposed in alternation with the stator plates 12 and serving as the movable element of the condenser. The rods 24 pass through the posts in the form of screws, receiving nuts 25 on the outside of the posts. The assembly of the rods therefore being carefully adjusted to exact form and tightened to rigid condition. The supporting screws 20 are adjustably held in the cross-head 17 by lock nuts 26 above and below, so that when these are released the screws may be raised or lowered as desired in order that the rods 24 may be uniformly spaced relative to the stator plates 12. By tightening the nuts 26 in suitably adjusted position, the movable element becomes rigidly fixed, and the relation of the movable element and stator element remains the same during the operation of the condenser, not being subject to variation from handling or erratic operation by amateurs, as frequently occurs in the case of rotary condensers.

The movable element is moved horizontally along the stator by the novel vernier gearing previously mentioned. With the condenser applied to a typical receiving set, screws 27 may be used to secure the condenser to the base-board 28 of the set, and the panel 29 is suitably drilled 30 for the centering of the dial 31. The spindle 32 which receives the dial is journaled in a bearing 33 carried by one of the cross-pieces 10ª of the frame, and it carries a large spur gear 34. This gear meshes with a pinion 35 on a shaft 36 parallel to the screw 18 and journaled bearings 37 also mounted on the cross-pieces 10ª. The shaft 36 receives at its opposite end a spur gear 38 which in turn operates a pinion 39 mounted on one end of the screw 18. It will be seen that while the gearing between the dial 31 and the screw 18 is of a multiplying character, the actual movement of the cross-head 17 carrying the movable element will be very slow, enabling a fine adjustment in the operation of the condenser. Also, while it has been customary to make the effective operation of the dial extend through but 180 degrees, the present dial may be calibrated to the full 360 degrees in order to secure the greatest amount of latitude in the operation of the movable element. The latter is flexibly connected to a binding post 40 on the frame by a stranded wire conductor 41 as is the usual practice.

Particular attention is directed to the form of the stator plates 12. This form is similar to a trapezium and is especially indicated in Figure 4, where the plate is purposely illustrated detached from its securing ends 12ª. The plates are not triangular, but as stated, in the form of a trapezium, and the rate at which their sides are spread vary the capacity thereof; also, the fact that the plates taper uniformly results in a straight line of frequencies as the movable element moves along the stator.

It will be seen that the novel condenser is built along strictly mechanical and positive lines, whereby it may be handled by an amateur without danger of loss of adjustment or damage. The parts are so fixed and adjusted that once the proper setting of the elements is made there will be no variation therein, and the condenser will operate at its highest efficiency. Also, the maximum latitude of the motor operating gearing together with the uniform design of the condenser will result in the ample and equal spacing of frequencies all along the line of operation. The peculiar use of rods (24), rather than plates, in co-operation with the plates 12 is to lend the novel condenser a low capacity which in creating a high inductance provides greater latitude between frequencies, and therefore permits the separation of signals having closely-spaced frequencies.

While the mechanism has been illustrated in preferred form, I am aware that it is capable of many minor changes and refinements, and I therefore wish to claim all such changes and refinements as coming within the scope and spirit of the appended claims.

I claim:—

1. A variable condenser having one element in the form of a series of spaced plates and the co-operating element in the form of a series of rods in alternation with the plates.

2. A variable condenser having one element in the form of a series of spaced trapezium-shaped plates and the co-operating element in the form of a series of rods in alternation with the plates.

3. A variable condenser comprising a frame, an assembly of spaced stator plates mounted in the frame, a screw, a traveling nut mounted on the latter for motion in a plane parallel to the plate assembly, a frame carried by the traveling nut, and a series of rods in the frame and arranged in alternation with the plates.

4. A variable condenser comprising a frame, an assembly of spaced stator plates mounted in the frame, a screw, a traveling nut mounted on the latter for motion in a plane parallel to the plate assembly, a frame carried by the traveling nut, a series of rods in the frame and arranged in alternation with the plates, and means for adjusting the latter-mentioned frame to uniformly space the rods from the plates.

In testimony whereof I affix my signature.

MAX KLEIN.